(12) United States Patent
Zhong et al.

(10) Patent No.: US 12,390,884 B2
(45) Date of Patent: Aug. 19, 2025

(54) TEXTURED SURFACE OF OIL AND GAS EQUIPMENT AND MACHINING METHOD THEREOF

(71) Applicant: Southwest Petroleum University, Chengdu (CN)

(72) Inventors: Lin Zhong, Chengdu (CN); Guorong Wang, Chengdu (CN); Qingyou Liu, Chengdu (CN); Gang Wei, Chengdu (CN); Xia He, Chengdu (CN); Linyan Chen, Chengdu (CN); Gang Hu, Chengdu (CN); Chuan Wang, Chengdu (CN); Zheng Zhang, Chengdu (CN); Zhichao Li, Chengdu (CN); Zixuan Wang, Chengdu (CN); Xiaolong Wu, Chengdu (CN)

(73) Assignee: SOUTHWEST PETROLEUM UNIVERSITY, Chengdu (CN)

( * ) Notice: Subject to any disclaimer, the term of this patent is extended or adjusted under 35 U.S.C. 154(b) by 115 days.

(21) Appl. No.: 17/935,692

(22) Filed: Sep. 27, 2022

(65) Prior Publication Data
US 2023/0100604 A1 Mar. 30, 2023

(30) Foreign Application Priority Data

Sep. 30, 2021 (CN) .......................... 202111160029.2

(51) Int. Cl.
*B23K 26/352* (2014.01)
*C10M 177/00* (2006.01)
(Continued)

(52) U.S. Cl.
CPC ......... *B23K 26/355* (2018.08); *C10M 177/00* (2013.01); *E21B 17/1085* (2013.01);
(Continued)

(58) Field of Classification Search
CPC ................ B23K 26/355; C10M 177/00; E21B 17/1085; B05D 2350/33; C10N 2030/06;
(Continued)

(56) References Cited

U.S. PATENT DOCUMENTS

| | | |
|---|---|---|
| 2003/0083879 A1 | 5/2003 | Cyr et al. |
| 2003/0116214 A1 | 6/2003 | Meli et al. |
| 2018/0355271 A1* | 12/2018 | Kim ................... C10M 101/025 |

FOREIGN PATENT DOCUMENTS

| | | | |
|---|---|---|---|
| CN | 103453021 A | * 12/2013 | ............. E21B 10/22 |
| CN | 106090001 A | * 11/2016 | ............. B23P 15/00 |

(Continued)

OTHER PUBLICATIONS

Translation to English of CN108775337 A via espacenet. accessed Aug. 19, 2024. (Year: 2018).*

(Continued)

*Primary Examiner* — Alicia J Weydemeyer
*Assistant Examiner* — Laura B Figg
(74) *Attorney, Agent, or Firm* — Passe Intellectual Property LLC; James G Passe

(57) ABSTRACT

A textured surface of oil and gas equipment includes a first substrate, an antiwear coating, and a second substrate, and further includes a texture, where the texture includes a first texture and/or a second texture; the first substrate and the second substrate are capable of moving relative to each other when operating, the first texture is arranged on a surface of the first substrate that is in contact with the antiwear coating, the second texture is arranged on a surface of the antiwear coating that is in contact with the second substrate. A method for machining the textured surface of oil and gas equipment is provided, which improves various performances of the oil and gas equipment such as antifriction, wear resistance, and corrosion resistance by combining a coating with a texture, so as to prolong the service life of the oil and gas equipment, increase oil and gas production efficiency.

17 Claims, 1 Drawing Sheet

(51) Int. Cl.
  *C10N 30/06* (2006.01)
  *C10N 40/02* (2006.01)
  *C10N 50/08* (2006.01)
  *E21B 17/10* (2006.01)

(52) U.S. Cl.
  CPC ...... *B05D 2350/33* (2013.01); *C10N 2030/06* (2013.01); *C10N 2040/02* (2013.01); *C10N 2050/08* (2013.01)

(58) Field of Classification Search
  CPC .... C10N 2040/02; C10N 2050/08; B32B 3/30
  See application file for complete search history.

(56) References Cited

FOREIGN PATENT DOCUMENTS

| CN | 106853560 | A |   | 6/2017  |             |
|----|-----------|---|---|---------|-------------|
| CN | 107237821 | A | * | 10/2017 |             |
| CN | 107740051 | A |   | 2/2018  |             |
| CN | 107761072 | A |   | 3/2018  |             |
| CN | 108251783 | A | * | 7/2018  | ...... C23C 4/02 |
| CN | 108775337 | A | * | 11/2018 | ...... E21B 10/22 |
| CN | 110374881 | A |   | 10/2019 |             |
| CN | 213839282 | U | * | 7/2021  | ...... C23C 4/02 |

OTHER PUBLICATIONS

Translation to English of CN213839282U via espacenet. accessed Aug. 19, 2024. (Year: 2021).*
Translation to English of CN-107237821-A via FIT database on Search. accessed Aug. 19, 2024 (Year: 2017).*
Translation to English of CN-108251783-A via FIT database on Search. accessed Aug. 19, 2024 (Year: 2018).*
Translation to English of CN-103453021-A via FIT database on Search. accessed Aug. 19, 2024 (Year: 2013).*
Translation to English of CN-106090001-A via FIT database on Search. accessed Aug. 19, 2024 (Year: 2016).*

* cited by examiner

TEXTURED SURFACE OF OIL AND GAS EQUIPMENT AND MACHINING METHOD THEREOF

CROSS REFERENCE TO RELATED APPLICATION

This patent application claims the benefit and priority of Chinese Patent Application No. 202111160029.2, filed on Sep. 30, 2021, the disclosure of which is incorporated by reference herein in its entirety as part of the present application.

TECHNICAL FIELD

The present disclosure relates to the technical field of oil and gas equipment, and in particular, to a textured surface of oil and gas equipment and a machining method thereof.

BACKGROUND ART

Currently, the global energy problem is becoming increasingly severe, and development of conventional oil and gas resources is far from meeting needs of human beings. Rapid development of a technology for exploration and development of deep sea/deep oil and gas and unconventional resources facilitates alleviation of an energy crisis. However, complex and severe environmental factors such as high temperature, high pressure, corrosion, and erosion limit a service life and an operating performance of oil and gas equipment, and directly affect efficiency and costs of exploration and development of deep sea/deep oil and gas and unconventional resources.

Conventional oil and gas equipment usually improves a tribological performance of a friction pair of relative moving parts by improving a mechanical structure or using only a technology of a single coating, and has the disadvantages of insufficient antifriction and antiwear effects and poor corrosion resistance, resulting in the problem that it is difficult to meet production requirements by using the service life of the equipment.

Therefore, how to comprehensively improve wear resistance and corrosion resistance of the oil and gas equipment to cope with a complex and severe operating condition, break the bottleneck of an oil and gas exploitation technology, further improve the operating performance of the oil and gas equipment, and increase oil and gas production is an urgent problem to be solved at present.

SUMMARY

An objective of the present disclosure is to provide a textured surface of oil and gas equipment and a machining method thereof, to solve the above problems existing in the prior art, and to improve various performances of the oil and gas equipment such as antifriction, wear resistance, and corrosion resistance by combining a coating with a texture, so as to prolong the service life of the oil and gas equipment, increase oil and gas production efficiency, and reduce economic losses caused by device failure.

To achieve the above objective, the present disclosure provides the following solution: The present disclosure provides a textured surface of oil and gas equipment, including a first substrate, an antiwear coating, and a second substrate, and further including a texture, where the texture includes a first texture and/or a second texture; the first substrate and the second substrate are capable of moving relative to each other when operating, the first texture is arranged on a surface of the first substrate that is in contact with the antiwear coating, and the second texture is arranged on a surface of the antiwear coating that is in contact with the second substrate.

Preferably, the texture includes a plurality of pits or protrusions in different shapes, and the plurality of pits or protrusions are distributed and combined in three dimensions to form textured regions.

The pits or the protrusions are each in the shape of one or more of a circular texture, a square texture, a triangular texture, a cylindrical texture, and a cross texture.

Preferably, the pits or the protrusions each have a depth of 20-200 μm and a diameter of 50-500 μm.

Preferably, a proportion of an area of the first texture to a surface area of the first substrate is 1%-15%, and a proportion of an area of the second texture to a surface area of the antiwear coating is 1%-15%.

Preferably, the plurality of pits or protrusions of the texture are uniformly and orderly arranged or arranged at intervals.

Preferably, a solid lubricant is distributed on a surface of the second substrate.

Preferably, before laser machining of the texture, the surface of the antiwear coating is strengthened and modified by laser.

The present disclosure further discloses a method for machining the textured surface of oil and gas equipment, including the following steps:

step 1: selecting the first substrate;

step 2: spraying a coating on an outer surface of the first substrate to obtain the antiwear coating;

before the coating is sprayed on the outer surface of the first substrate, machining the first texture on the surface of the first substrate that is in contact with the antiwear coating; and/or after the coating is sprayed on the outer surface of the first substrate, machining the second texture on the surface of the antiwear coating that is in contact with the second substrate; and step 3: selecting the second substrate.

Preferably, in step 3, a solid lubricant is uniformly sprayed on the surface of the second substrate to obtain the second substrate with a solid lubricating coating.

Compared with the prior art, the present disclosure has the following beneficial technical effects:

The present disclosure proposes the textured surface that combines a surface texture with a coating and is applied to the oil and gas equipment, which improves various performances of the oil and gas equipment such as antifriction, wear resistance, erosion resistance, corrosion resistance, and vibration resistance by combining the coating with the texture, so as to prolong the service life of the oil and gas equipment, increase oil and gas production efficiency, and reduce economic losses caused by device failure.

BRIEF DESCRIPTION OF THE DRAWINGS

To describe the technical solutions in the embodiments of the present disclosure or in the prior art more clearly, the accompanying drawings required for the embodiments are briefly described below. Apparently, the accompanying drawings in the following description show merely some embodiments of the present disclosure, and a person of ordinary skill in the art may still derive other accompanying drawings from these accompanying drawings without creative efforts.

1. First substrate; 2. Antiwear coating; 3. Solid lubricant; 4. Second substrate; 5. Second texture; 6. First texture; 7. First journal substrate; 8. Antiwear bearing coating; 9. Second shaft sleeve substrate; 10. Bearing solid lubricant; 11. Second bearing texture; and 12. First bearing texture.

DETAILED DESCRIPTION OF THE EMBODIMENTS

The technical solutions in the embodiments of the present disclosure are described clearly and completely below with reference to the accompanying drawings in the embodiments of the present disclosure. Apparently, the described embodiments are merely some rather than all of the embodiments of the present disclosure. All other embodiments obtained by a person of ordinary skill in the art based on the embodiments of the present disclosure without creative efforts shall fall within the protection scope of the present disclosure.

An objective of the present disclosure is to provide a textured surface of oil and gas equipment and a machining method thereof, to solve the above problems existing in the prior art, and to improve various performances of the oil and gas equipment such as antifriction, wear resistance, erosion resistance, and corrosion resistance by combining a coating with a texture, so as to prolong the service life of the oil and gas equipment, increase oil and gas production efficiency, and reduce economic losses caused by device failure.

To make the above objective, features, and advantages of the present disclosure clearer and more comprehensible, the present disclosure will be further described in detail below with reference to the accompanying drawings and specific implementations.

Figure 1:
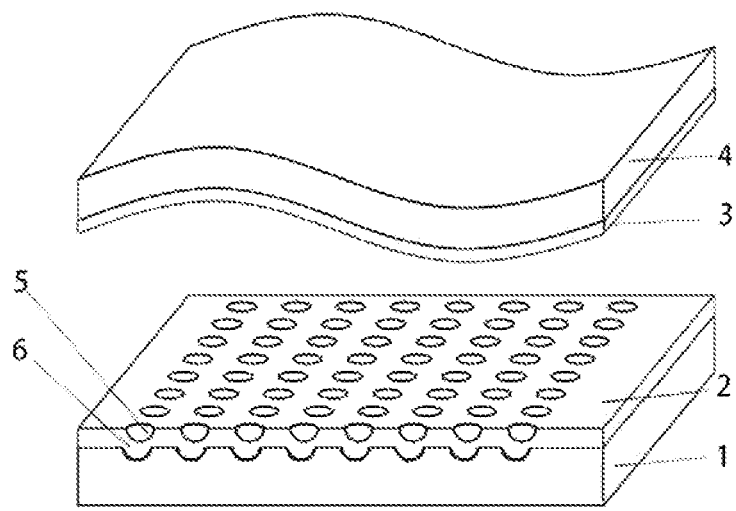
FIG. 1 is a schematic structural diagram of a textured surface of oil and gas equipment according to the present disclosure.

As shown in FIG. 1, this embodiment provides a textured surface of oil and gas equipment, including a first substrate, an antiwear coating, and a second substrate, and further including a texture, where the texture includes a first texture and/or a second texture; the first substrate and the second substrate are capable of moving relative to each other when operating, the first texture is arranged on a surface of the first substrate that is in contact with the antiwear coating, and the second texture is arranged on a surface of the antiwear coating that is in contact with the second substrate.

The oil and gas equipment with the texture combined with the coating is machined by using the following method including the following steps.

Step 1: Machine a first texture 6 on a surface of a first substrate 1 by laser to obtain a surface texture. Pits (micro-pits) or protrusions of the first texture 6 are each in the shape of one or more selected from a circular texture, a square texture, a triangular texture, a cylindrical texture, and a cross texture. A plurality of micro-pits or protrusions form textured regions, which are uniformly distributed on an entire surface of the first substrate 1 at intervals along a plane or a curved surface.

Step 2: Machine a uniform hard antiwear coating on the surface of the first substrate 1 with the surface texture, and strengthen the surface by laser to obtain a hard antiwear coating 2.

Step 3: Machine the surface texture on a surface of the hard antiwear coating 2 by laser to obtain a hard antiwear coating 2 with a second surface texture 5. The micro-pits or the protrusions of the first texture 6 and the second texture 5 each have a depth of 50-200 μm and a diameter of 50-500 μm, and a texture area proportion is 1%-15%. The micro-pits or the protrusions of the second texture 5 are each in the shape of one or more selected from a circular texture, a square texture, a triangular texture, a cylindrical texture, and a cross texture. A plurality of micro-pits or protrusions are combined in three dimensions to form textured regions, which are arranged at intervals in a contact region of the oil and gas equipment in friction.

Step 4: Uniformly spray a solid lubricant 3 on a surface of a second substrate 4 to obtain the second substrate 4 with a solid lubricating coating. The first substrate 1 is in contact with the second substrate 4.

The first substrate 1 and the second substrate 4 may be interchanged in relative positions based on a specific use status of the equipment. When only a single substrate is provided, step 4 may be omitted.

In step 1, a specific process of machining the first texture 6 by laser includes the following steps.

S1: Place the to-be-machined first substrate 1 on a laser machining rotary translation machining table, and use an ejector pin and a coaxiality detection meter to perform adjustment for a stable clamping position, and set required laser machining parameters.

S2: Adjust the laser machining rotary translation machining table for focusing, pre-scan the to-be-machined surface, and perform texture machining on the surface of first substrate 1 through translation and rotary movement combined with a laser beam, to form the first texture 6.

Testing of a friction performance of the coating-textured equipment: Based on operating condition characteristics of specific coating-textured oil and gas equipment, the following tests are selectively performed on a coating-textured object.

1. Bonding Strength Between a Coating and a Substrate

A surface scratch tester is used to apply a positive load to the surface coating on the first textured substrate 1. The first substrate 1 and a test diamond indenter slide relatively slowly, the load is gradually increased until the coating is peeled off, and the load strength of the coating peeling off is recorded. Whether the coating is peeled off can be determined by a graphic fluctuation of an acoustic sensor. A greater load strength of the coating during peeling off indicates a higher bonding strength between the coating and the first substrate 1.

2. Testing of Antifriction and Antiwear Effects of a Textured Surface

1) Antifriction Performance Testing

A unit/full-scale bearing testing machine is used for friction performance testing. A unit/full-scale coating-textured drill bit sliding bearing is machined by laser. A friction coefficient and a wear life of the sliding bearing are detected under a simulated operating condition, and are compared with those of a non-textured full-scale specimen under the same simulated operating condition. A textured surface with a lower friction coefficient and a lower wear amount indicates better antifriction and antiwear effects.

2) Surface Temperature Testing

A temperature monitoring system of a multifunctional friction tester is used to observe temperature changes of the coating-textured specimen in real time, and temperatures and temperature rise in various time periods and operating conditions are compared with those of the non-textured specimen, so as to evaluate effects of the surface texture in terms of cooling.

3) Surface Wear Analysis

The specimen having undergone the friction test is recovered, and the surface morphology is observed by ultrasonic cleaning, scanning electron microscopy (SEM), a white light interferometer, a metallographic microscope, and the like. Surface wear morphologies of textured and non-textured friction pairs are compared and analyzed. A better preserved textured surface indicates better antifriction and antiwear effects.

3. Leakage Quantity Testing for Sealing

After coating-textured machining is performed on the oil and gas equipment under sealing requirements, operation under a real operating condition is simulated on a full-scale device, leaked lubricating oil or drilling fluid is recovered for volume measurement, and then the leakage quantity is quantitatively analyzed.

4. Statistics of an Actual Service Life

The coating-textured equipment and non-textured equipment operate to failure under the simulated operating condition, and the service life of the coating-textured equipment used on site is counted to evaluate whether the surface texture has the effect of prolonging the service life.

Embodiment 1

Figure 2:
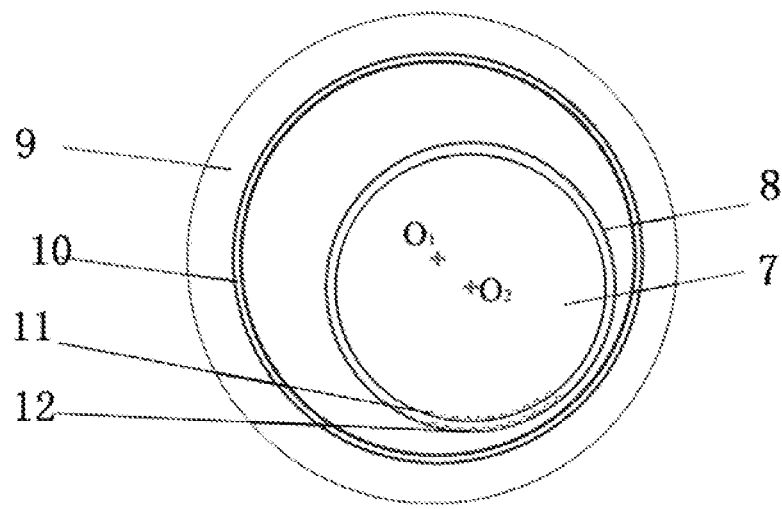
FIG. 2 is a schematic diagram of an arrangement of a coating textured bearing in Embodiment 1.

As shown in FIG. 2, this embodiment provides a coating-textured roller bit sliding bearing, including a first journal substrate 7, an antiwear bearing coating 8, a second shaft sleeve substrate 9, a bearing solid lubricant 10, second bearing textures 11, and first bearing textures 12. The coating-textured sliding bearing can effectively improve antiwear and antidrag effects of the bearing.

Step 1: Machine the second bearing textures 11 by laser on a surface of the first journal substrate 7, where the second bearing textures 11 are uniformly arranged at intervals or arranged at intervals on an entire journal surface in a circumferential direction to obtain a journal with a texture.

Optionally, a machining method may be sputtering, electroplating, mask electrolytic machining, embossing machining, micro ultrasonic machining or chemical etching, and the like, to form textures with target parameters. Each micro-pit texture is in the shape of a textured region composed of one or two of a circular texture, a square texture, a triangular texture, a cylindrical texture, and a cross texture.

Step 2: Spray the antiwear bearing coating 8 on the surface of the journal with the texture to obtain a journal with a coating. The coating is made of an antiwear alloy material.

Step 3: Machine the first bearing textures 12 on the surface of the antiwear bearing coating 8 by laser to obtain a textured surface.

Further, the textures each have a depth of 20-200 µm and a diameter of 50-500 µm, and a texture area proportion is 1%-15%.

Optionally, a method for machining the second bearing textures 11 and the first bearing textures 12 may be sputtering, electroplating, mask electrolytic machining, embossing machining, micro ultrasonic machining or chemical etching, and the like, to form textures with target parameters. Each journal texture is in the shape of a textured region composed of one or more of a circular texture, a square texture, a triangular texture, a cylindrical texture, and a cross texture. The textured regions are partial bearing regions or are uniformly arranged on the entire surface of the journal at intervals in a circumferential direction.

Step 4: Machine a solid lubricant 3 on a surface of the second shaft sleeve substrate 9 to obtain a shaft sleeve with the bearing solid lubricant 10.

Step 5: Select a method related to coating bonding and friction performance testing to test the coating-textured drill bit sliding bearing.

The coating-textured drill bit sliding bearing obtained through the solution of the present disclosure uses common antifriction effects of the coating and the texture, and the characteristics of a hydrodynamic lubrication effect produced by the surface texture to increase a bearing capacity of a lubricating oil film, reduce friction and wear between the journal and the shaft sleeve, and further improve friction and wear performances of the sliding bearing. Furthermore, the texture is used to increase roughness of the substrate and the coating technology is combined to greatly increase the bonding strength between the coating and the substrate, alleviate the problem that the coating is prone to peel off in the operating process of the sliding bearing, and increase surface corrosion resistance and wear resistance.

It should be noted that it is obvious to those skilled in the art that the present disclosure is not limited to the details of the above exemplary embodiments, and that the present disclosure can be implemented in other specific forms without departing from the spirit or basic features of the present disclosure. Therefore, the embodiments should be regarded as exemplary and non-limiting in every respect. The scope of the present disclosure is defined by the appended claims rather than the above description, therefore, all changes falling within the meaning and scope of equivalent elements of the claims should be included in the present disclosure, and any reference numeral in the claims should not be construed as a limitation to the claims involved.

Specific examples are used for illustration of the principles and implementations of the present disclosure. The description of the above embodiments is merely used to help understand the method and its core ideas of the present disclosure. In addition, a person of ordinary skill in the art can make modifications in terms of specific implementations and scope of use according to the ideas of the present disclosure. In conclusion, the content of the present description shall not be construed as limitations to the present disclosure.

What is claimed is:

1. A textured surface of oil and gas equipment, comprising a first substrate, an antiwear coating, and a second substrate, wherein the textured surface of oil and gas equipment further comprises a texture, wherein the texture comprises a first texture and a second texture; the first substrate and the second substrate are capable of moving relative to each other when operating, the first texture is arranged on a surface of the first substrate that is in contact with the antiwear coating, and the second texture is arranged on a surface of the antiwear coating that is in contact with the second substrate;
   wherein before laser machining of the second texture, the surface of the antiwear coating is strengthened and modified by laser to obtain a hard antiwear coating;
   wherein the texture comprises a plurality of pits or protrusions, and the plurality of pits or protrusions are distributed and combined in three dimensions to form textured regions; and
   wherein the plurality of pits or protrusions of the texture are uniformly and orderly arranged or arranged at intervals.

2. The textured surface of oil and gas equipment according to claim 1, wherein the pits or the protrusions are each in the shape of one or more of a circular texture, a square texture, a triangular texture, a cylindrical texture, and a cross texture.

3. The textured surface of oil and gas equipment according to claim 1, wherein the pits or the protrusions each have a depth of 20-200 μm and a diameter of 50-500 μm.

4. The textured surface of oil and gas equipment according to claim 1, wherein a proportion of an area of the first texture to a surface area of the first substrate is 1%-15%, and a proportion of an area of the second texture to a surface area of the antiwear coating is 1%-15%.

5. He textured surface of oil and gas equipment according to claim 1, wherein a solid lubricant is distributed on a surface of the second substrate.

6. A method for machining the textured surface of oil and gas equipment according to claim 1, comprising the following steps:
step 1: selecting the first substrate;
step 2: spraying a coating on an outer surface of the first substrate to obtain the antiwear coating, specifically comprising:
before the coating is sprayed on the outer surface of the first substrate, machining the first texture on the surface of the first substrate that is in contact with the antiwear coating; and/or after the coating is sprayed on the outer surface of the first substrate, machining the second texture on the surface of the antiwear coating that is in contact with the second substrate; and
step 3: selecting the second substrate.

7. The method for machining the textured surface of oil and gas equipment according to claim 6, wherein the texture comprises a plurality of pits or protrusions, and the plurality of pits or protrusions are distributed and combined in three dimensions to form textured regions.

8. The method for machining the textured surface of oil and gas equipment according to claim 7, wherein the pits or the protrusions are each in the shape of one or more of a circular texture, a square texture, a triangular texture, a cylindrical texture, and a cross texture.

9. The method for machining the textured surface of oil and gas equipment according to claim 7, wherein the pits or the protrusions each have a depth of 20-200 μm and a diameter of 50-500 μm.

10. The method for machining the textured surface of oil and gas equipment according to claim 6, wherein a proportion of an area of the first texture to a surface area of the first substrate is 1%-15%, and a proportion of an area of the second texture to a surface area of the antiwear coating is 1%-15%.

11. The method for machining the textured surface of oil and gas equipment according to claim 7, wherein the plurality of pits or protrusions of the texture are uniformly and orderly arranged or arranged at intervals.

12. The method for machining the textured surface of oil and gas equipment according to claim 6, wherein a solid lubricant is distributed on a surface of the second substrate.

13. The method for machining the textured surface of oil and gas equipment according to claim 6, wherein before laser machining of the texture, the surface of the antiwear coating is strengthened and modified by laser.

14. The method for machining the textured surface of oil and gas equipment according to claim 6, wherein in step 3, a solid lubricant is uniformly sprayed on the surface of the second substrate to obtain the second substrate with a solid lubricating coating.

15. The method for machining the textured surface of oil and gas equipment according to claim 7, wherein in step 3, a solid lubricant is uniformly sprayed on the surface of the second substrate to obtain the second substrate with a solid lubricating coating.

16. The method for machining the textured surface of oil and gas equipment according to claim 8, wherein in step 3, a solid lubricant is uniformly sprayed on the surface of the second substrate to obtain the second substrate with a solid lubricating coating.

17. The method for machining the textured surface of oil and gas equipment according to claim 9, wherein in step 3, a solid lubricant is uniformly sprayed on the surface of the second substrate to obtain the second substrate with a solid lubricating coating.

* * * * *